Figure 5:
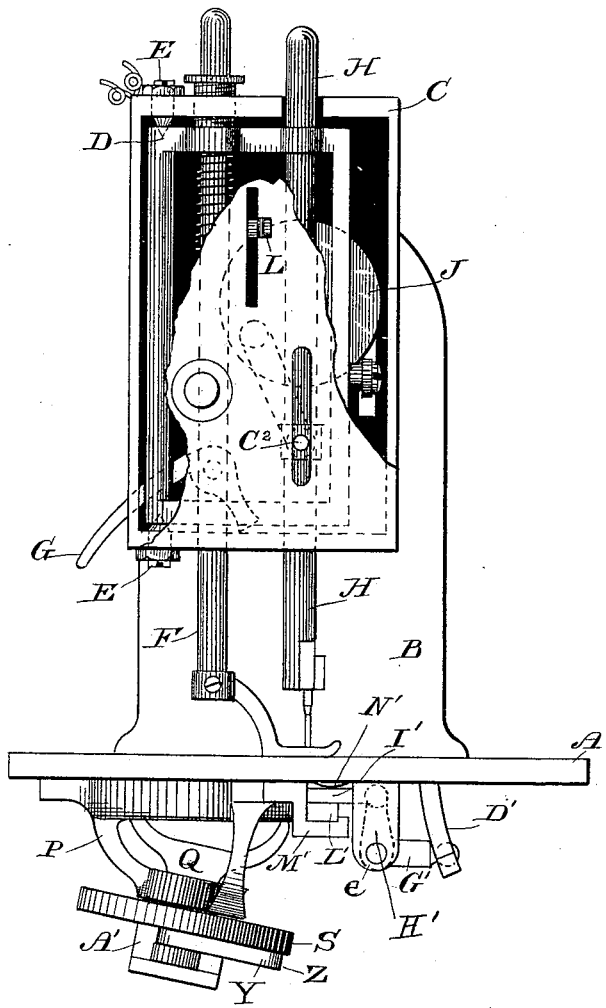

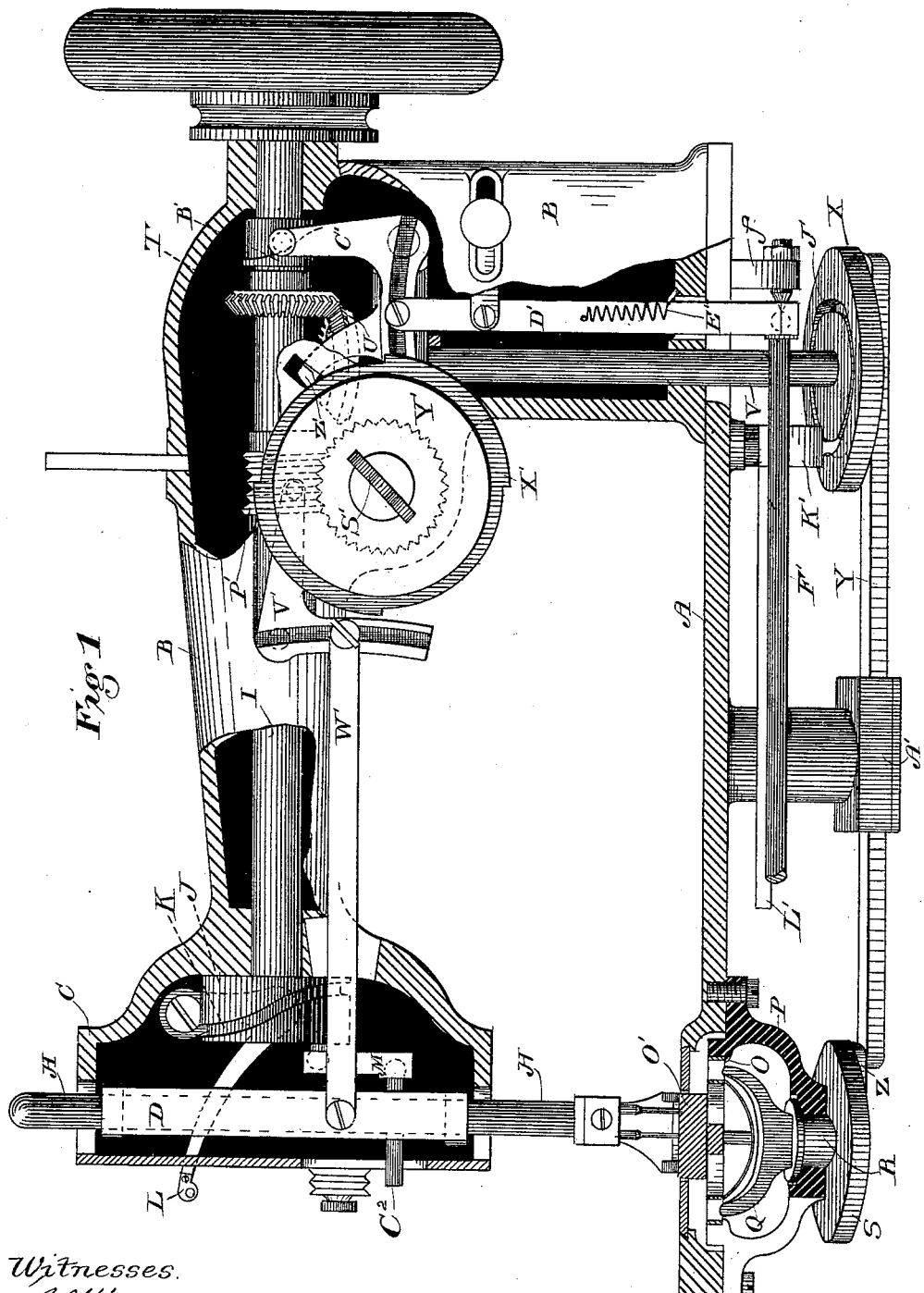

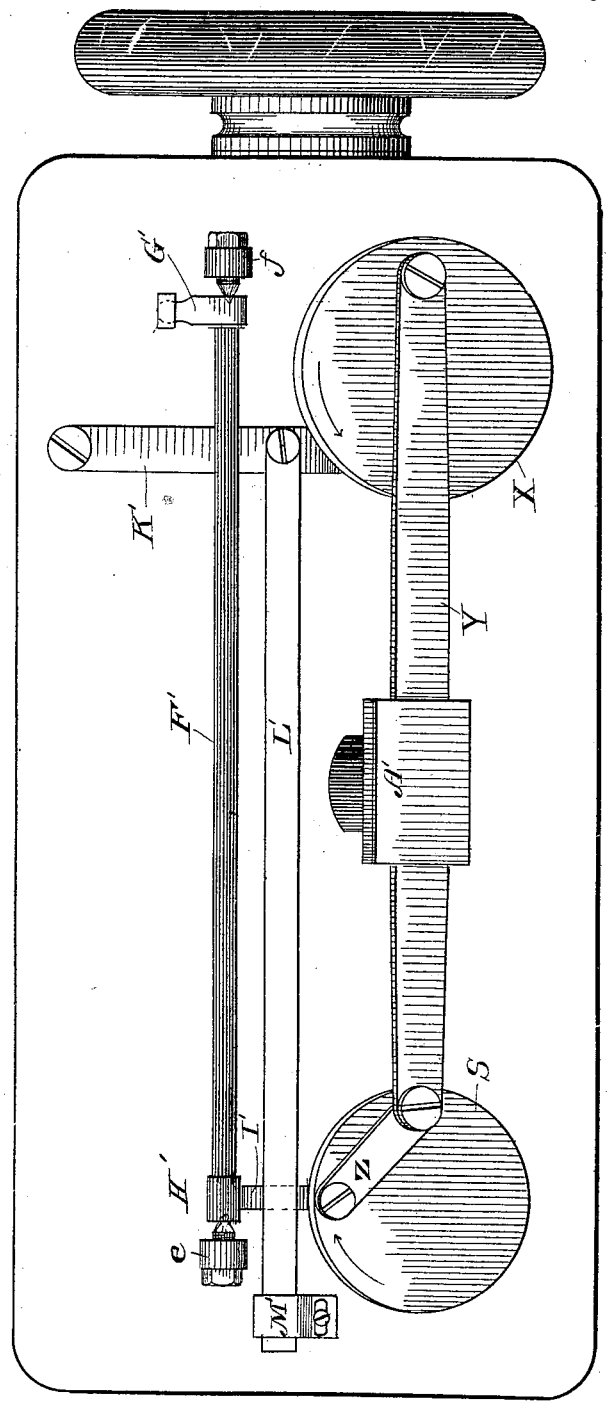

(No Model.)  5 Sheets—Sheet 3.
F. T. LEILICH.
SEWING MACHINE.
No. 386,252.  Patented July 17, 1888.
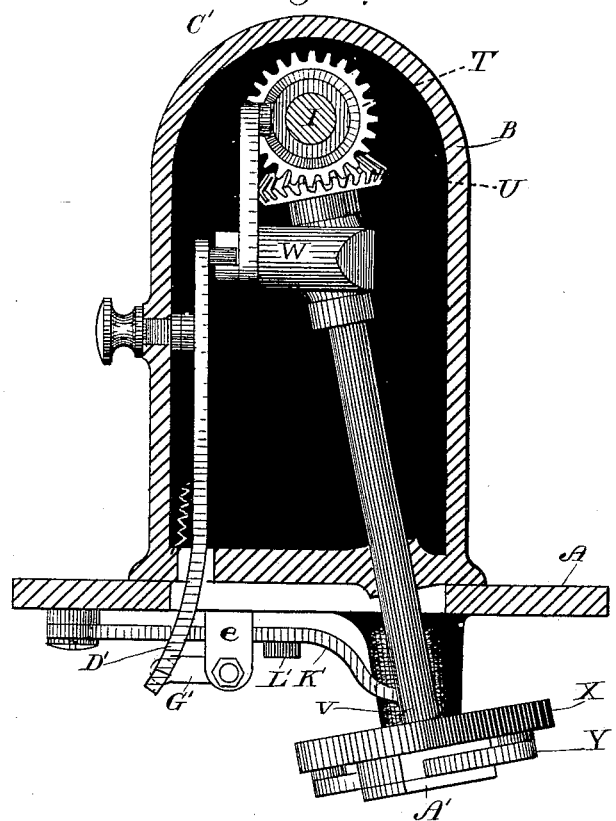
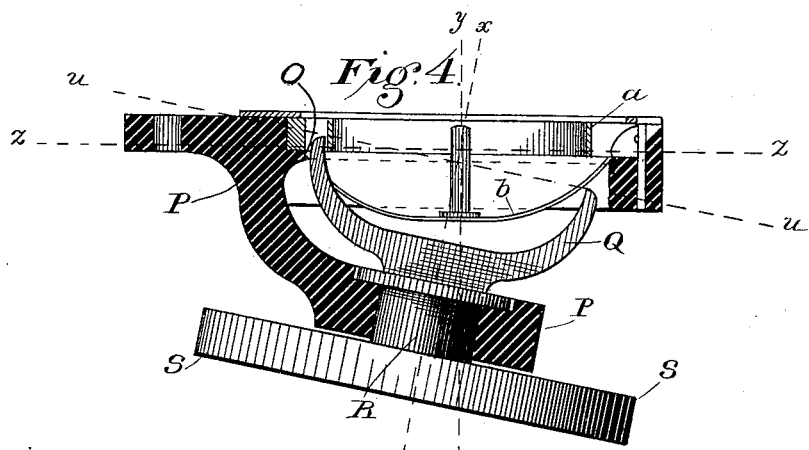
Witnesses.
S. Williamson.
W. T. Haviland.
Inventor,
Francis T. Leilich,
By Smith & Hubbard,
Attys.
N. PETERS, Photo-Lithographer, Washington, D. C.

(No Model.) 5 Sheets—Sheet 4.

F. T. LEILICH.
SEWING MACHINE.

No. 386,252. Patented July 17, 1888.

Witnesses,
S. S. Williamson.
W. T. Haveland.

Inventor
Francis T. Leilich,
By
Smith & Hubbard,
Att'ys.

N. PETERS, Photo-Lithographer, Washington, D. C.

(No Model.) 5 Sheets—Sheet 5.
F. T. LEILICH.
SEWING MACHINE.
No. 386,252. Patented July 17, 1888.
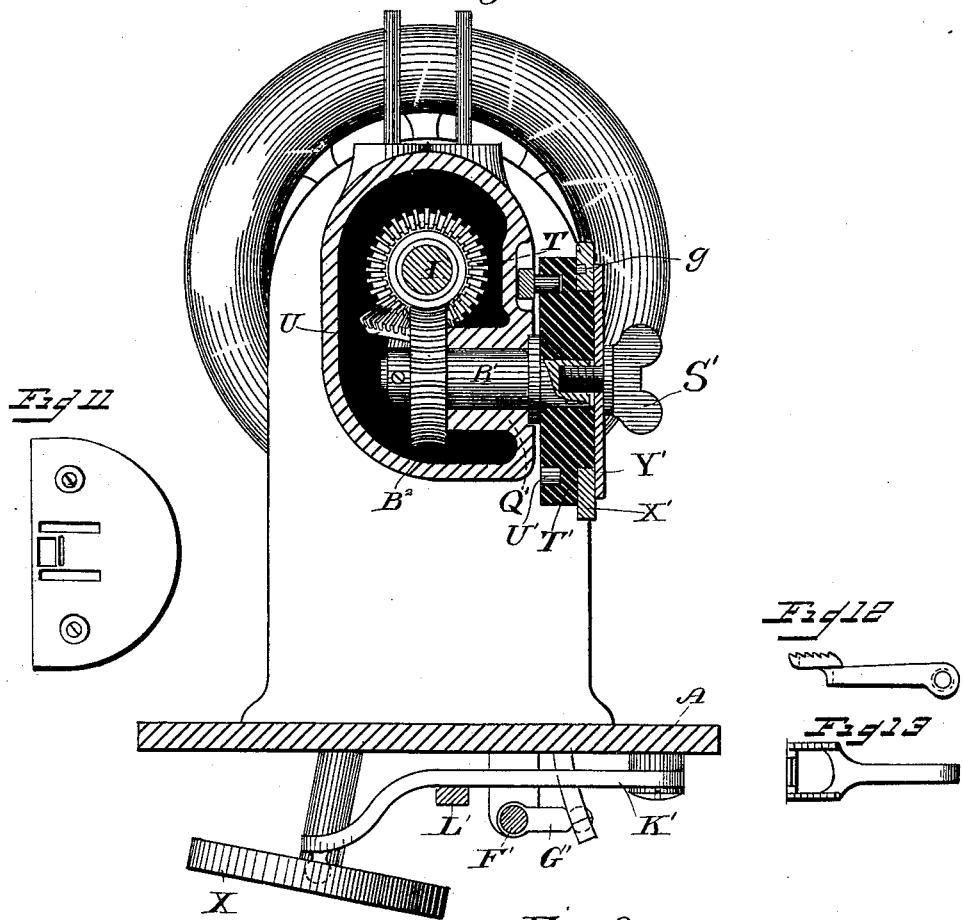
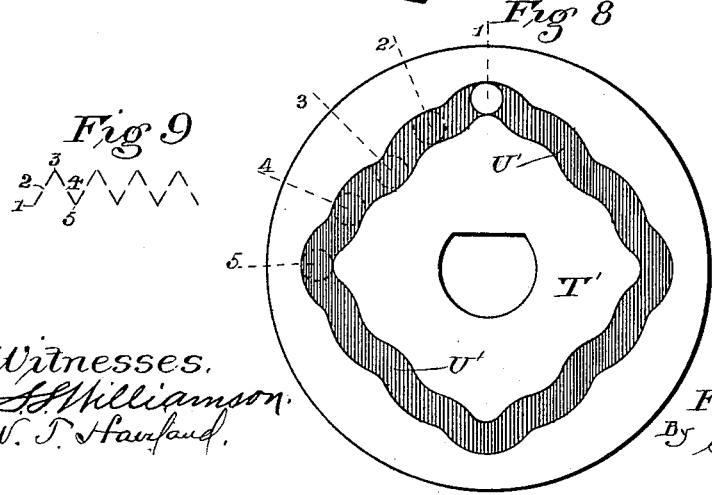
Witnesses.
J. S. Williamson.
W. T. Hawfaud.
Inventor.
Francis T. Leilich,
By Smith & Hubbard,
Attys.

United States Patent Office.

FRANCIS T. LEILICH, OF BRIDGEPORT, CONNECTICUT.

SEWING-MACHINE.

SPECIFICATION forming part of Letters Patent No. 386,252, dated July 17, 1888.

Application filed November 6, 1885. Serial No. 182,013. (No model.)

*To all whom it may concern:*

Be it known that I, FRANCIS T. LEILICH, a citizen of the United States, residing at Bridgeport, in the county of Fairfield and State of Connecticut, have invented certain new and useful Improvements in Combination-Stitch Sewing-Machines; and I do hereby declare the following to be a full, clear, and exact description of the invention, such as will enable others skilled in the art to which it appertains to make and use the same.

My invention relates to sewing-machines, and has for its object to provide, first, a machine capable of producing the straight single lock-stitch seam common to sewing-machines in public use, but which shall also be capable of sewing a double seam or two parallel lines of stitching adjustable as to distance at the will of the operator within certain limits; secondly, to provide a machine capable of producing a large variety of fancy stitches, but which, without disturbing or removing the work, may be adjusted so as to sew the straight seam or seams; thirdly, to effect the changes referred to—viz., from single to double and from plain to fancy stitching—by mechanism of such simplicity that it may be readily operated by any one conversant with ordinary sewing-machines; fourthly, to effect the fancy stitching by simple and positive devices, thereby permitting the machine to be run at high speeds; fifthly, to furnish a system and mechanism for the driving of a rotary shuttle which shall be entirely positive in its operation and which shall allow a perfectly free passage for the loop thrown by the needle between the shuttle and the driver thereof, and, sixthly, to produce a transverse rotary shuttle sewing-machine capable of the changes hereinbefore specified, which shall be simple in construction, positive in action, easy of change and adjustment, and with friction and wear and tear reduced to a minimum; and with these ends in view my invention consists in the details of construction and combination of elements hereinafter fully explained, and then embodied in the claims.

In order that those skilled in the art to which my invention appertains may fully comprehend its construction, I will now describe the same in detail, referring by letter to the accompanying drawings, forming a part of this specification, in which—

Figure 6:
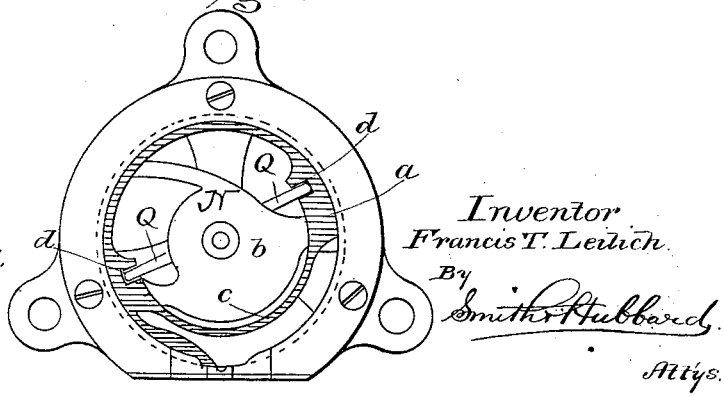

Figure 1 is a longitudinal vertical section of the arm and bed of my machine, but with the moving parts and a portion of the arm shown in elevation; Fig. 2, a bottom view; Fig. 3, a transverse vertical section of the upright portion of the arm with the mechanism within shown in elevation; Fig. 4, an enlarged transverse vertical section of the shuttle-race casting, showing the driver, its shaft, and disk in elevation; Fig. 5, a front elevation of the head partially broken away to show the needle-bar, the gate, and the presser bar within; Fig. 6, a plan view of the shuttle lying in the race; Fig. 7, a transverse section through the arm and pattern-disk, the worm-wheel and shaft being in elevation; Fig. 8, an enlarged plan view of the pattern-disk, several positions of the stud therein being shown in dotted lines; Fig. 9, an enlarged view of the stitch-pattern determined by the pattern-disk shown, and Fig. 10 a similar view of the stitch produced by the co-operation of the pattern-disk and pattern-ring; Fig. 11, a plan of the throat-plate; Fig. 12, a side elevation of the feed-dog, and Fig. 13 a plan of the feed-dog.

Similar letters denote like parts in all the figures of the drawings.

A is the bed of the machine, and B the overhanging arm mounted on the bed-plate.

C is the head, formed integral with the arm B.

D is a gate held between pivotal points E passed through the top and bottom of the head, as seen at Fig. 5.

The presser-bar F is of ordinary construction. It is held in guides in the extremities of the head, and is operated by a lifter, G, of any convenient form. Openings are formed in the upper and lower sides of the gate, through which the presser-bar passes, and these are of sufficient size to permit a swinging movement to said gate without interference from the bar.

H is a vertical needle-bar, held within guides in the pivoted gate. Openings in the top and bottom of the head permit the needle-bar to move with the gate on the pivotal points of the latter. (See Figs. 1 and 5.)

I is the main shaft of the machine supported in journal-bearings formed in the forward and rear ends of the arm, respectively, and a pulley and hand-wheel of any ordinary construction are secured upon its outer extremity.

Upon the forward end of the main shaft and within the head is mounted a crank-disk, J. In the peripheral cam-groove K in the disk J operates a take-up, L, pivotally secured inside the head, said take-up having at its elbow a roll or stud which runs in said groove. The movement of the take-up is properly timed relative to the throw of the needle-bar. A link, M, secured by universal joints both to the crank-disk and the needle-bar, imparts the motion of the former to the latter in vertical reciprocations. The purpose of the universal-joint connections is to allow the needle-bar to be reciprocated in different planes. A pin, $C^2$, on the needle-bar projects through a slot in the head and prevents said bar from turning on its axis.

N (see Fig. 6) is a segmental rotary shuttle composed, essentially, of a partial ring, $a$, a web, $b$, secured beneath said ring, and a rib, $c$, extending from the heel of said partial ring to a point a little behind the point thereof in an arc whose radius is shorter than the radius of the ring. In the inner edge of the ring are formed two recesses, $d$, (see Fig. 6,) by means of which the shuttle is adapted to be driven, as will presently appear.

A bobbin, of large diameter and ordinary construction, is adapted to be carried in the shuttle. I have not thought it necessary to show the bobbin in the drawings.

The shuttle runs upon a flange, O, formed in the top of the race-casting P, (see Fig. 4,) which casting is secured to the bottom of the bed-plate, as may be seen at Figs. 1 and 5.

Q is a two-armed shuttle-driver rigidly mounted upon a flanged short shaft, R, which is journaled in the bottom of the race-casting. Beneath the latter the driver-disk S is secured upon said shaft concentric therewith. The axial plane of the short shaft just referred to is arranged at an angle to the axial plane of the shuttle, as may readily be observed by reference to the lines $x\ x$ and $y\ y$. (Shown in Fig. 4.) The planes of rotation respectively of the shuttle and driver-points, each being at ninety degrees to its axial plane, will be at the same angle relative to each other as said axial planes, as shown by the lines $u\ u\ z\ z$ in the figure last referred to. The angle at which the planes are shown in the drawings is substantially ten degrees; but that is not material, and the extent of angular variation may be changed without departing from the spirit of my invention.

A variably-speeded rotary motion is given to the driver-disk S by the following mechanical elements: Bevel-gears T U, the former rigid on shaft I, the latter immovable upon the upper extremity of a shaft, V, which is journaled in bearings formed in lug W, projecting backward from the inner surface of the upright portion of the arm and in the bed of the machine. The inclination of this shaft is the same as the inclination of the axial plane of the driver-shaft R, and consequently at ninety degrees to the plane of rotation of disk S.

X is a disk secured on the lower extremity of shaft V, and connection between it and disk S is effected by the oscillating lever-pitman Y, pivoted to disk X and connected to disk S by a short link, Z, pivotally secured both to disk and pitman. A slide-box, A', pivoted to a lug depending from the bottom of the bed-plate, confines the pitman at the center thereof, but permits to it a limited longitudinal reciprocation. The planes of rotation of disks S and X and the plane of extension of the pitman are the same, or parallel to one another, and have the same inclination.

The feeding of the goods in my machine I accomplish as follows:

B' is a face-cam mounted upon shaft I behind the beveled gears, and C' is a bell-crank lever pivoted at its elbow to the lug W within the arm of the machine. The horizontal arm of the lever is grooved in the arc of a circle throughout its length, and the upper extremity of a connecting-rod, D', is secured to said arm, as by a stud sliding in the groove. Spring E' tends to pull the rod downward, and consequently to hold a friction-roll, with which the upper end of the vertical arm of the lever is provided, in constant contact with the face of the cam B'. A rock-shaft, F', held between bearings passed through lugs $e\ f$ on the bottom of the bed of the machine, receives movement from the connecting-rod D' through a short arm, G', to which the lower end of said rod is pivotally secured. A similar short arm, H', (see Fig. 2, and dotted lines, Fig. 5,) at the other extremity of the rock-shaft, but projecting upwardly from the latter, imparts to the feed-bar I', which is pivotally secured to its upper extremity, a to-and fro movement transverse of the machine. An eccentric-groove, J', in the upper surface of disk X, gives motion to a pivoted curved lever, K', one end of which carries a shoe running in said groove, and the other end of which is pivoted to the bed-plate.

L' is a connecting-bar extending beneath the bed-plate longitudinal thereof, with one end movably secured to the lever K' and with the other end, whose surface is inclined, supported upon a bracket, M', whose surface is inclined in an opposite direction. The free end of the feed-bar rests upon the bar L'. The reciprocating movement acquired by the latter in the operation of the machine and the overriding of the inclined surfaces of bracket and bar consequent thereto raise the feed-bar against the action of a spring, N', which in turn depresses said feed-bar when permitted by the inclines. This forms a four-motion feed, spring-actuated as to its backward and downward throw.

O' is the feed-dog, mounted on the feed-bar. The throw of the feed-dog may be varied by adjusting the position of the rod D' in the slot of the bell-crank C' by means of the link and set-screw adjustment device shown on the arm in Fig. 1, so that the vertical traverse of the said rod will be greater or less.

P' is a worm formed on the main shaft. (See Fig. 1.)

Q' is an inwardly-projecting lug formed on the inner surface of the arm near the juncture of the vertical and horizontal portions of the latter, as shown at Fig. 7. A short shaft, R', is journaled in this lug and carries upon its inner extremity a worm-wheel, B², meshing with and actuated by the worm. The shaft R' is shouldered just outside the arm, and beyond the shoulder is extended, but in D form, and tapped for the reception of a thumb-screw, S'.

T' is a disk provided in its inner face with a zigzag groove, U', whose plan view is clearly shown at Fig. 8. A D-shaped opening at the center of the disk is adapted to closely fit over the extended portion of the short shaft R', so that the latter will carry said disk.

V' is a bell-crank lever whose elbow is pivoted to the outer surface of the arm, and whose horizontal portion is provided at its extremity with a slide roll or stud projecting within the groove U'. The vertical portion of the lever is grooved in the arc of a circle throughout its length, and the end of a rod-connection, W', is adjustably secured in said groove, as by a set-screw. The other extremity of the rod-connection is secured to the side of the gate D.

X' is a pattern-ring which fits over the outer face of the disk T', which is shouldered for its reception, and is held thereon by one or more pins, g, extending into the body of the disk. The ring is held in place by a cap-plate, Y', which is tightly secured against the ring and disk by a set-screw, S', threaded into the shaft. The disk therefore carries the ring. The pattern ring illustrated in the drawings (see Fig. 1) is of two different diameters, each alternating with the other through an arc of ninety degrees. The purpose of this contour will be presently set forth. A curved arm, Z', is formed integral with the horizontal portion of bell-crank lever C', and has upon its end a rigid projection at right angles thereto, extending out through the arm and engaging with the periphery of the pattern-ring.

The needle-bar in my machine is arranged by means of a double clamp to accommodate either a single needle or two needles placed side by side.

It will be observed that in my construction the rotary shuttle is placed directly in the line of travel of the feed and immediately behind the needle-bar.

In consequence of the change of vertical plane of the needle-bar and the fact of two needles being used, I slot the throat-plate to permit free movement to the needles therethrough.

The operation of my invention is as follows: The main shaft is revolved by means of the ordinary belt, and its crank-disk vertically reciprocates the needle-bar. The beveled gears transmit the motion of the main shaft to the inclined shaft, and thence, through the medium of the two disks and their connecting-pitman, the rotation of the shuttle-driver shaft and its driver is effected. The inclination of the driver-shaft and the height of the points of the driver are such that when said driver is in the position shown at Fig. 1—that is, with the line of its arms longitudinal of the machine—both of its points will project within the recesses d in the rim of the shuttle. This position of the driver occurs of course twice in each revolution. After passing one of these positions the difference of the angles of the axes around which the shuttle and driver rotate causes one of the points of the latter to rise in its recess while the other is leaving its recess. Thus the shuttle is driven by the alternate engagement of the driver-points with the recesses, and during short periods of each revolution is driven by both points at once. One of the periods of engagement of both points occurs at the time the loop is thrown by the needle and taken by the point of the shuttle. Then, as the latter rotates, carrying and spreading the loop, the driver-point nearest behind the shuttle-point is receding from its recess and the opposite driver-point is carrying the shuttle alone. This permits the loop to pass the first driver-point, and by the time it has been carried around to the other side of the race, and is ready to be pulled off and up by the take-up, the position of the driver-points has been reversed, the point farthest around has receded, and the first point is carrying the shuttle. This allows the loop free passage by the second driver-point.

The feed is substantially the feed described in a certain application filed by me and bearing Serial No. 179,320, and date of filing the 8th day of October, 1885, and to said application I desire to refer for a more particular description of the same.

The above description includes all the parts of my machine necessary for the sewing of a straight seam.

In sewing pattern-stitches the pattern disk alone or the pattern-disk and pattern-ring operating in conjunction (according to the form of pattern to be made) are employed to vary the vertical plane of the needle-bar relative to the line of feed, and also to vary the throw of the feed or to cut out the latter entirely. The variation in the vertical plane of the needle-bar is effected by means of the pattern-disk, the modification or entire cessation of the feed by means of the ring.

The revolution of the main shaft through the worm produces in the worm-wheel and the shaft and disk carried thereby one revolution to a certain number of revolutions of the main shaft. The number required to effect this revolution determines the number of stitches and patterns.

For convenience of illustration, I have taken sixteen revolutions of the main shaft to one of the pattern-disk; but, as will be readily understood, any number might be used by a corresponding change of worm and wheel. The plan view shown in Fig. 8 is of a disk adapted, without the use of the ring, to produce in one revolution four patterns of four stitches each, as shown at Fig. 9. The same disk, in conjunction with the ring shown at Fig. 1, will in a single revolution produce two patterns of eight stitches each, as shown at Fig. 10. The stud upon the horizontal portion of the pivoted bell-crank lever V' is held in the groove in the pattern-disk, as has been before explained, and consequently the bell-crank lever is, by the changes of contour of the groove, caused to oscillate upon its pivotal point.

The connection between the vertical portion of the lever and the gate in which the needle-bar is held causes the latter to be actuated at each actuation of the bell-crank lever. The extent of the actuation thus imparted may be varied at will, according as the end of the rod-connection is secured nearer to or farther from the pivotal point of the bell-crank. In sewing a straight seam the rod-connection is secured directly upon the pivotal point of the bell-crank, in which case of course there can be no movement to the gate.

The form of groove in the pattern disk determines the extent and timing of the sidewise throw of the needle-bar—as, for instance, in the contour shown at Fig. 8. from the position of the roll designated as "1" to that designated as "2," makes the first stitch, and from "2" to "3" the second. As these two are both in a position to shorten the radial distance from the roll to the center of the disk, it is obvious that the two stitches must be in the same direction and the second a continuation of the first. Numbers corresponding to those on the positions designated on the disk are shown upon the stitches in Fig. 9. From "3" to "5" the trend of the groove is such as to lengthen the radial distance from roll to center. Consequently the direction of the sidewise throw will be reversed and the two stitches made thereby will be as shown at "4" "5," Fig. 9. The throw of the feed, which is constantly acting on the goods, determines the angle of departure of the stitches from the line of feed. In this way a line of stitches may be sewed, whose length, inclination, and sidewise throw may be varied, as aforesaid. The outward projection from the arm Z' engages with the periphery of the pattern ring, but the movement of the bell-crank lever C' throws it out of engagement at every revolution of the main shaft. When it is desired to form a pattern in which are stitches at right angles to the line of feed, (as, for instance, that pattern shown at Fig. 10,) the ring is employed to supplement the action of the pattern-disk by its control of the feed. During the first two stitches from position 1, Fig. 8, the projection from the curved arm on the bell-crank C' is thrown out of engagement with the periphery of the ring at one of its arcs of small diameter. When drawn back by the bell-crank for the third time, however, it engages with one of the arcs of large diameter, and its return movement is prevented. This, as will be readily understood, holds the stud or roll on the upper end of the bell-crank C' out of engagement with the face-cam on the main shaft against the action of spring E', and therefore the feed (which is operated by the contact of roll and cam) cannot work again until by the revolution of the ring the projection which engages therewith again strikes an arc of small diameter. As this time admits of the formation of four stitches (one-quarter of a revolution of the ring) and the pattern-disk has meanwhile given to the needle-bar sidewise reciprocations equal to two stitches and return, the result will be, as seen at Fig. 10—viz., two stitches at an angle to the feed-line, (made by the combined forces of the sidewise throw of the needle-bar and the forward movement of the feed,) then two stitches at ninety degrees to the line of feed, (made by the sidewise throw of the needle-bar while the feed is entirely cut out,) then two stitches back upon the two last named, (made by the return throw of the needle-bar, the feed being still cut out,) and then two stitches at an angle, (made by the sidewise throw of the needle-bar in combination with the feed which the return of the projection on the bell-crank to an arc of small diameter has once more permitted to work.) The design shown at Fig. 9 contains four patterns of four stitches each, the design at Fig. 10 two of eight stitches each.

I have shown and described a pattern-ring of two diameters only, the one serving to cut out the feed entirely and the other to permit its full throw; but by the use of rings having an arc or arcs of a diameter intermediate between the two described I am able to so control the feed that it may have any throw, and thus may the angles and length of stitches be varied independent of the throw at which the feed is set.

The action of the shuttle in taking, spreading, and casting the loop and the action of the take-up in drawing the latter are the same as in my pending application, Serial No. 179,320, and the bobbin arrangement is substantially the same.

In using two needles I take the upper threads from spools held upon spindles at the top of the machine, and I lead the threads through a double tension and two openings in the arm of the take-up. The shuttle takes and spreads the two loops at one time, and the under thread serves to lock the two upper threads. By arrangement of the tensions of the upper and under threads, respectively, either the lower thread forms a zigzag on the bottom of the goods from one line of stitches to the other, or it forms a straight line, and the two upper threads are drawn to it. This locking of two upper by a single lower thread I find to be sufficiently secure for all practical purposes.

It will be readily understood that by the use of pattern-disks having grooves of different contours and pattern-rings of varied peripherical outline I am enabled to produce a great variety of stitches, and by the use of two needles the double row of patterns may be so interwoven as to form a single ornamental band.

In my invention I do not wish to be confined to the exact details of construction going to compose my machine as a whole, for I can readily use my shuttle-driving mechanism upon a machine constructed simply for the sewing of a straight seam; or I can apply my pattern-determining device to a machine whose shuttle mechanism is not that shown in this application. The gist of my invention lies, first, in the shuttle-driving mechanism; second, in the devices for predetermining the pattern-stitches, and, third, in the combination of the two last-named in a single machine.

Having thus described my invention, what I claim as new, and desire to secure by Letters Patent, is—

1. The combination, with the needle-bar and the main shaft and its link-connection, whereby the needle-bar is reciprocated, of the horizontal rotary shuttle, the two armed shuttle-driver whose plane of rotation is oblique to that of the shuttle and its race, the short shaft journaled in the bottom of the shuttle-race casting, the oblique connecting-shaft V and its gears, and the oscillating lever-pitman connecting the disks beneath the bed of the machine, whereby a variably-speeded rotary motion is imparted to the shuttle, substantially as specified.

2. The combination of the main shaft journaled in the arm, the needle-bar and the link-connection, the oblique connecting-shaft geared to the main shaft, the driver-shaft of the same obliquity as the connecting-shaft and journaled in the race-casting, the shuttle-race at right angles to the line of descent of the needle-bar, the shuttle, the two-armed shuttle-driver, and the oblique disks and their connecting oscillating lever-pitman, said disks and pitman being at a plane oblique to the plane of the bed and at right angles to the oblique plane of the driver and connecting shafts, substantially as described.

3. The combination, with the main shaft and the crank disk mounted thereon, of the needle-bar, the link M, universally jointed at both ends, and the pin C², connecting the link and needle-bar, extending through the latter, and with its outer extremity projecting through a slot in the face of the head, substantially as set forth.

4. In a sewing-machine, the combination, with the main shaft, of the worm thereon, the short transverse shaft journaled in the arm and carrying a worm-wheel meshing with the worm, the sinuously-grooved pattern-disk removably secured upon the outer extremity of the transverse shaft, the bell-crank lever pivoted to the arm and actuated by the sinuous groove in the disk, the connecting-rod adjustably secured to the grooved arm of the bell-crank, and the gate carrying the needle-bar and pivotally hung within the head of the machine, all arranged as described, and for the purpose set forth.

5. In a sewing-machine, the combination of the stitch-forming mechanism, the feeding mechanism, the sinuously-grooved pattern-disk driven from the main shaft, and means whereby the latter imparts movement to the needle-bar gate, of a pattern-ring of varied diameter secured upon said disk and adapted to engage with and control the action of the feeding devices, substantially as set forth.

6. The combination, with the needle-bar and the main shaft, of the sinuously-grooved pattern-disk and the means whereby the latter is actuated, the bell-crank lever pivoted to the arm and engaging with the pattern-groove, the connecting-rod and the pivoted gate, the face-cam on the main shaft, the bell-crank lever of the feed, and a pattern-ring secured upon and revolving with the pattern-disk and adapted to engage and hold the said bell-crank out of engagement with its cam, substantially as specified.

7. The combination, with the main shaft, of the face-cam mounted thereon, the bell-crank lever pivoted within the arm and engaging with the cam, the vertical and spring-detained connecting-rod, the pivoted rock-shaft and its arms, the curved and pivoted lever actuated by the eccentric-groove in the disk, the bar L′, the feed-bar and feed-dog, the adjustable and inclined bracket, and a pattern-ring of varying diameter actuated from the main shaft, and adapted by its engagement with the bell-crank lever of the feed to permit or prevent contact of the latter with its cam, substantially as described.

8. In a sewing-machine, the combination of the main shaft, the needle-bar hung in the pivoted gate, the transverse rotary shuttle, the two-armed shuttle-driver, the driver-shaft and connecting-shaft oblique to the main shaft, the disks and oscillating lever-pitman oblique to the bed-plate, the worm, worm-wheel, and transverse shaft, the sinuously-grooved and removable pattern-disk, the bell-crank and the rod connecting the latter with the gate, the cam-actuated bell-crank lever, the feed mechanism, as shown and described, and the pattern-ring secured upon and revolving with the pattern-disk and adapted by its varying contour to alternately permit and prevent the actuation of the bell-crank by its cam, substantially as specified.

In testimony whereof I affix my signature in presence of two witnesses.

FRANCIS T. LEILICH.

Witnesses:
S. S. WILLIAMSON,
P. H. PRINDLE.